(12) United States Patent
Wu et al.

(10) Patent No.: US 12,443,305 B2
(45) Date of Patent: Oct. 14, 2025

(54) ELECTRONIC PANEL HAVING TWO OPERATING MODES WITH DIFFERENT DRIVING METHODS

(71) Applicant: InnoLux Corporation, Miao-Li County (TW)

(72) Inventors: Cheng-Min Wu, Miao-Li County (TW); Cheng-Hsiao Lin, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/434,857

(22) Filed: Feb. 7, 2024

(65) Prior Publication Data

US 2024/0319816 A1    Sep. 26, 2024

Related U.S. Application Data

(60) Provisional application No. 63/453,762, filed on Mar. 22, 2023.

(30) Foreign Application Priority Data

Dec. 22, 2023    (CN) .......................... 202311773589.4

(51) Int. Cl.
*G06F 3/041*    (2006.01)
*G06F 3/044*    (2006.01)

(52) U.S. Cl.
CPC ........ *G06F 3/04164* (2019.05); *G06F 3/0443* (2019.05)

(58) Field of Classification Search
CPC .. G06F 3/04164; G06F 3/0443; G06F 3/0412; G06F 3/04166; G06F 3/0446
See application file for complete search history.

(56) References Cited

U.S. PATENT DOCUMENTS

| | | | |
|---|---|---|---|
| 9,024,913 B1 * | 5/2015 | Jung | G09G 3/3655 345/174 |
| 2009/0121984 A1 * | 5/2009 | Yamamoto | G09G 3/3696 345/76 |
| 2020/0110483 A1 * | 4/2020 | Lee | G06F 3/0443 |
| 2021/0034833 A1 * | 2/2021 | Cheng | G06F 3/0412 |

FOREIGN PATENT DOCUMENTS

TW    201704964 A    2/2017

* cited by examiner

*Primary Examiner* — Stephen G Sherman
(74) *Attorney, Agent, or Firm* — Winston Hsu

(57) ABSTRACT

An electronic panel includes a driving circuit disposed in a peripheral region and having a first output terminal; a first electrode and a second electrode disposed in an active region and respectively electrically connected to a first signal line and a second signal line; a first switching component disposed in the peripheral region and electrically connected to the first output terminal, the first signal line and the second signal line; a second switching component disposed in the peripheral region and electrically connected to a common signal source, the first signal line and the second signal line. When the electronic panel operates in a first mode, the second switching component couples the common signal source to the first electrode and the second electrode. When the electronic panel operates in a second mode, the second switching component disconnects the common signal source from the first electrode and the second electrode.

15 Claims, 10 Drawing Sheets

ELECTRONIC PANEL HAVING TWO OPERATING MODES WITH DIFFERENT DRIVING METHODS

CROSS REFERENCE TO RELATED APPLICATION

This application claims the benefit of U.S. Provisional Application No. 63/453,762, filed on Mar. 22, 2023. The content of the application is incorporated herein by reference.

BACKGROUND OF THE DISCLOSURE

1. Field of the Disclosure

The present disclosure relates to an electronic panel, and more particularly to an electronic panel having an improving driving effect of a common signal.

2. Description of the Prior Art

As the evolution and development of electronic devices, the electronic devices have become an indispensable item. For instance, the electronic device (e.g., the electronic panel) could have a displaying function and a touch sensing function, so as to provide convenient information transmission and/or image display in the condition of a convenient operation.

In the electronic device, electronic components of the electronic device are electrically connected to the same output terminal of a driving circuit (e.g., a chip) through switching elements, and the output terminal of the driving circuit provides the same signal or different signals to different electronic components by controlling the switching elements. Through the above design, the number of output terminals required by the driving circuit could be reduced, thereby reducing the size and/or quantity of the driving circuit. However, due to the existence of these switching elements, an impedance (e.g., a resistance) of a relevant circuit increases accordingly, thereby affecting the functional performance of the electronic device (e.g., the performance of the displaying function and/or the touch sensing function could be reduced). Thus, the circuit in the electronic device needs to be improved, so as to improve the displaying function and/or the touch sensing function.

SUMMARY OF THE DISCLOSURE

According to an embodiment, the present disclosure provides an electronic panel having a first mode and a second mode for operating. The electronic panel includes a substrate, a driving circuit, the first electrode, a second electrode, a first signal line, a second signal line, a first switching component and a second switching component. The substrate has an active region and a peripheral region. The driving circuit is disposed in the peripheral region and has a first output terminal. The first electrode and the second electrode are disposed in the active region, the first signal line is electrically connected to the first electrode, and the second signal line is electrically connected to the second electrode. The first switching component is disposed in the peripheral region and electrically connected to the first output terminal, the first signal line and the second signal line. The second switching component is disposed in the peripheral region and electrically connected to a common signal source, the first signal line and the second signal line. The second switching component couples the common signal source to the first electrode and the second electrode when the electronic panel operates in the first mode, and the second switching component disconnects the common signal source from the first electrode and the second electrode when the electronic panel operates in the second mode.

DETAILED DESCRIPTION

Figure 1:
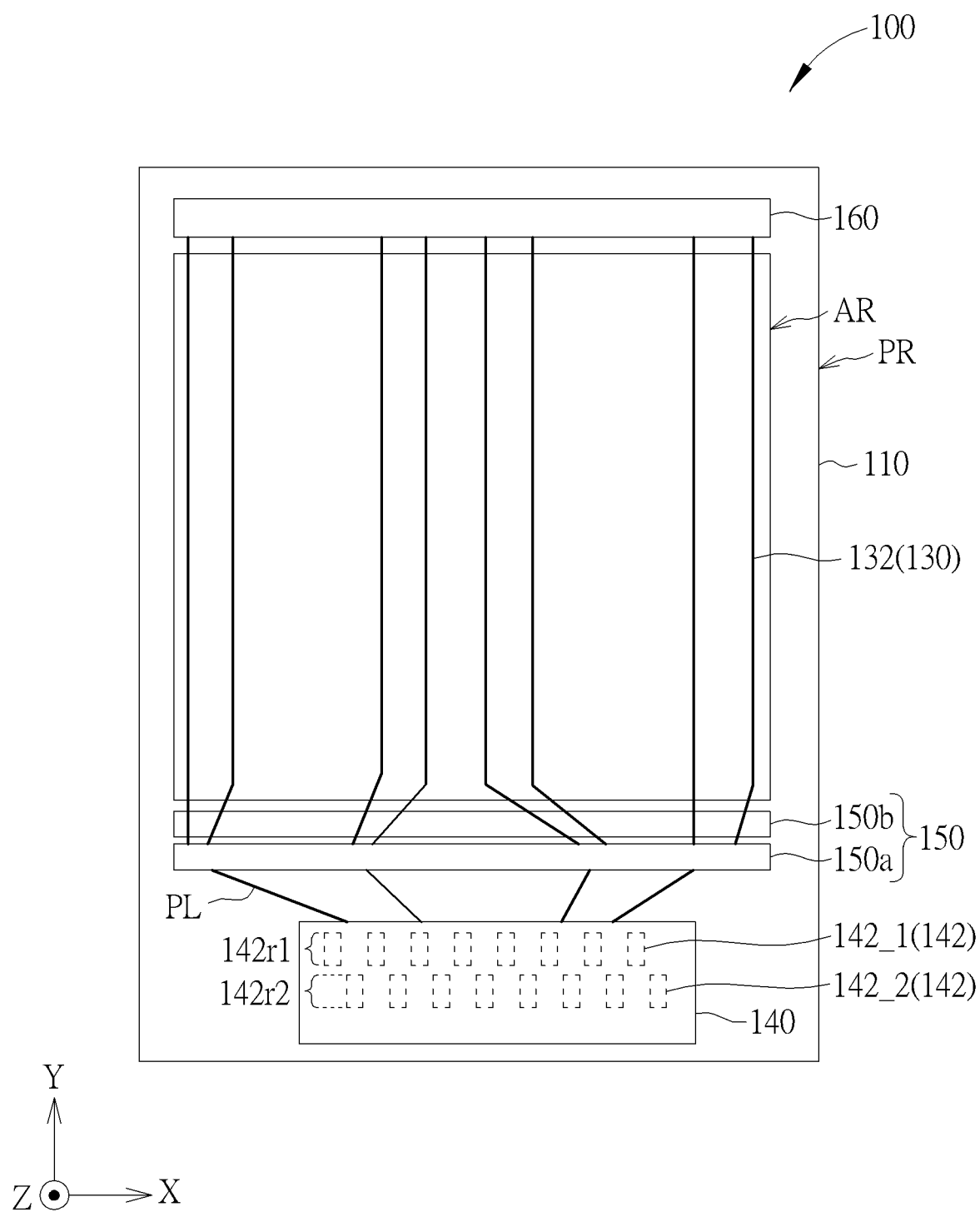
FIG. 1 is a schematic diagram showing a top view of an electronic panel according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of an electronic device in this disclosure, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names.

This document does not intend to distinguish between components that differ in name but not function.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to "on another component", it may be directly on this another component, or other component(s) may exist between them. On the other hand, when the component is referred to "directly on another component (or the variant thereof)", any component does not exist between them. Furthermore, when the corresponding component is referred to "on another component", the corresponding component and the another component have a disposition relationship along a top-view/vertical direction, the corresponding component may be below or above the another component, and the disposition relationship along the top-view/vertical direction are determined by an orientation of the device.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented. In addition, when the component is referred to "be coupled to/with another component (or the variant thereof)", it may be directly connected to this another component, or may be indirectly connected (such as electrically connected) to this another component through other component(s).

In the present disclosure, when a component is "electrically connected to" another component, an electrical signal would flow between these two components at certain times during normal operation. In the present disclosure, when a component is "couple to" another component, an electrical signal would flow between these two components within a designated time. In the present disclosure, when a component is "disconnected from" another component, an electrical signal would not flow between these two components within a designated time.

In the description and following claims, the term "horizontal direction" generally means a direction parallel to a horizontal plane, the term "horizontal plane" generally means a surface parallel to a direction X and direction Y in the drawings, the term "vertical direction" generally means a direction parallel to a direction Z and perpendicular to the horizontal direction in the drawings, and the direction X, the direction Y and the direction Z are perpendicular to each other. In the description and following claims, the term "top view" generally means a viewing result viewing along the vertical direction.

In the description and following claims, it should be noted that the term "overlap" means that two elements overlap along the direction Z, and the term "overlap" can be "partially overlap" or "completely overlap" in unspecified circumstances.

The terms "about", "approximately", "substantially", "equal", or "same" generally mean within ±20% of a given value or range, or mean within ±10%, ±5%, ±3%, ±2%, ±1%, or ±0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

In the present disclosure, the electronic device may include a display device, a lighting device, an antenna device, a sensing device, a tiled device or a combination thereof, but not limited thereto. The display device may be a non-self-luminous type display device or a self-luminous type display device based on requirement(s), and the display device may be a color display device or a monochrome display device based on requirement(s). The antenna device may be a liquid-crystal-type antenna device or a non-liquid-crystal-type antenna device, the sensing device may be a device for sensing capacitance, light, thermal or ultrasonic, and the tiled device may be a tiled display device or a tiled antenna device, but not limited thereto. Electronic components in the electronic device may include passive component(s) and active component(s), such as capacitor(s), resistor(s), inductor(s), diode(s), transistor(s), but not limited thereto. The diode may include a light emitting diode (LED) or a photodiode. The light emitting diode may include an organic light emitting diode (OLED), a mini LED, a micro LED or a quantum dot LED, but not limited thereto. The transistor may include a top gate thin film transistor, a bottom gate thin film transistor or a dual gate thin film transistor, but not limited thereto. The electronic device may include fluorescence material, phosphorescence material, quantum dot (QD) material or other suitable material based on requirement(s), but not limited thereto. The electronic device may have a peripheral system (such as a driving system, a control system, a light system, etc.) for supporting the device(s) and the component(s) in the electronic device.

In some embodiments, the electronic panel may be a type of electronic device, and the electronic panel may be a combination of a display device and a touch sensing device at least, so as to make the electronic panel have a displaying function and a touch sensing function at least. The following uses the electronic panel as an example to explain the present disclosure, but the design of the present disclosure may be applied on any suitable electronic device.

Furthermore, a switching element of the present disclosure may be any electronic component with switching effect. For example, the switching component may be a thin film transistor. For example, the thin film transistor may be a top gate thin film transistor, a bottom gate thin film transistor, a dual gate thin film transistor or other suitable transistors.

Figure 2:
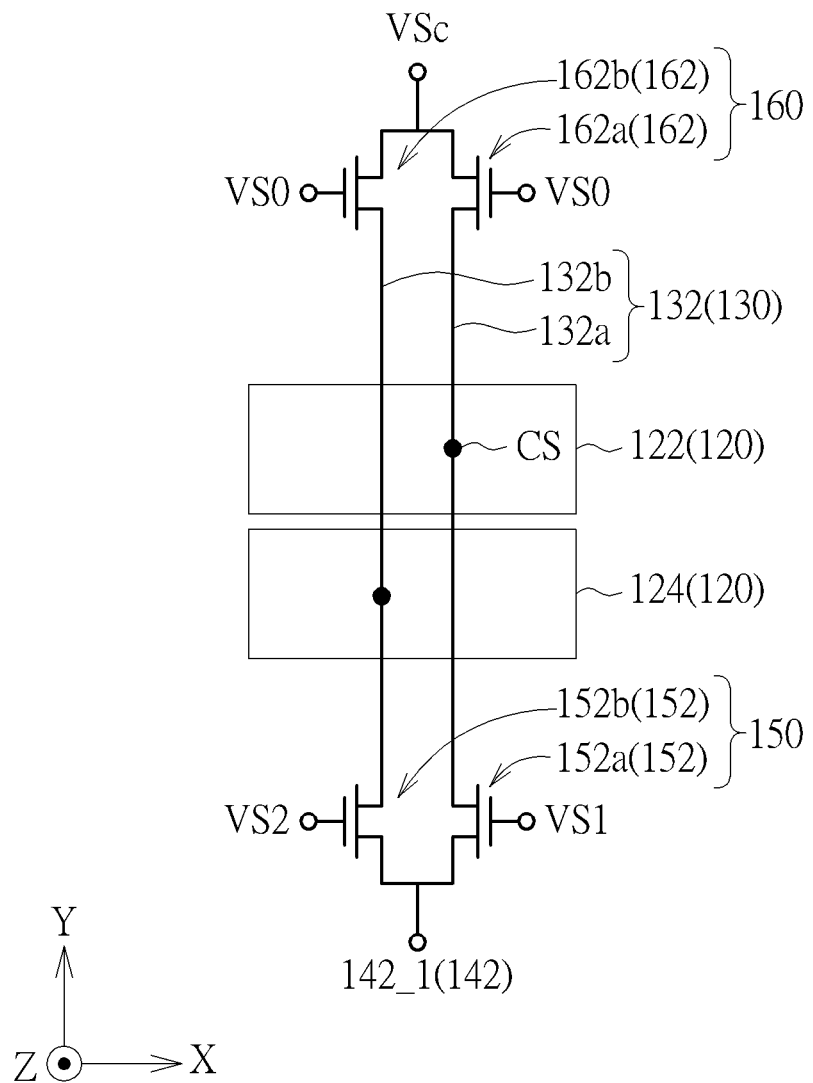
FIG. 2 is a schematic diagram showing electrodes, signal lines and switching components of the electronic panel according to the first embodiment of the present disclosure.

Referring to FIG. 1 and FIG. 2, FIG. 1 is a schematic diagram showing a top view of an electronic panel according to a first embodiment of the present disclosure, and FIG. 2 is a schematic diagram showing electrodes, signal lines and switching components of the electronic panel according to the first embodiment of the present disclosure. As shown in FIG. 1 and FIG. 2, the electronic panel 100 may include a substrate 110, and the electronic panel 100 may optionally include an opposite substrate (not shown in figures) opposite to the substrate 110, wherein the substrate 110 and the opposite substrate may be rigid or flexible individually, and the substrate 110 and the opposite substrate may include suitable material based on their types. For instance, the substrate 110 and the opposite substrate may individually include glass, quartz, ceramic, sapphire, polymer (e.g., polyimide (PI), polyethylene terephthalate (PET), etc.), other suitable materials or a combination thereof. In the present disclosure, some components and structures of the electronic panel 100 may be disposed on the substrate 110 (or may be disposed between the substrate 110 and the opposite substrate), so as to make the substrate 110 carry these components and structures. Note that a normal direction of the substrate 110 and a normal direction of the opposite substrate may be parallel to the direction Z.

As shown in FIG. 1, the substrate 110 may have an active region AR and a peripheral region PR, and the peripheral region PR disposed on at least one outer side of the active region AR (as shown in FIG. 1, the peripheral region PR may surround the active region AR for example). The components and the structures in the electronic panel 100 may be correspondingly disposed in the active region AR and/or the peripheral region PR based on their functions, so as to make the electronic panel 100 have the displaying function and the touch sensing function at least. The active region AR may be used for displaying and touch sensing, and the component(s) and the structure(s) configured to assist the active region AR in displaying and/or touch sensing may be disposed in the peripheral region PR.

In the present disclosure, the electronic panel 100 may include at least one conductive layer, at least one insulating layer, at least one semiconductor layer or a combination thereof, and these layers may be disposed on the substrate 110 to form the electronic components in the electronic panel 100. The material of the conductive layer may include metal, transparent conductive material (such as indium tin oxide (ITO), indium zinc oxide (IZO), etc.), other suitable conductive material(s) or a combination thereof, the material of the insulating layer may include such as silicon oxide ($SiO_x$), silicon nitride ($SiN_y$), silicon oxynitride ($SiO_xN_y$), organic insulating material (e.g., photosensitive resin), other suitable insulating material(s) or a combination thereof, and the material of the semiconductor layer may include such as poly-silicon, amorphous silicon, metal-oxide semiconductor, other suitable semiconductor material(s) or a combination thereof, but not limited thereto.

In the present disclosure, the touch sensing function of the electronic panel 100 may be implemented by one conductive layer or a plurality of conductive layers, and the electronic panel 100 may perform the touch sensing by any suitable method. For example, the electronic panel 100 may use a capacitive touch sensing module for sensing, such as a self-capacitance touch sensing module or a mutual-capacitance touch sensing module, but not limited thereto.

In some embodiments, as shown in FIG. 1 and FIG. 2, the electronic panel 100 may include a plurality of touch sensing electrodes 120 disposed on the substrate 110 and disposed in the active region AR, wherein the touch sensing electrodes 120 may be used for touch sensing. Note that FIG. 2 only shows a first touch sensing electrode 122 and a second touch sensing electrode 124 belonging to the touch sensing electrodes 120 for example, but more touch sensing electrodes 120 may be included in the electronic panel 100 actually.

The number of the touch sensing electrodes 120, the arrangement of the touch sensing electrodes 120 and the sizes of the touch sensing electrodes 120 may be designed based on requirement(s), wherein the number of the touch sensing electrode 120 and the sizes of the touch sensing electrode 120 are related to the sensitivity of the touch sensing function. In some embodiments, the touch sensing electrode 120 may be arranged in the direction X and the direction Y, so as to form a plurality of touch sensing rows extending along the direction X and arranged in the direction Y and a plurality of touch sensing columns extending along the direction Y and arranged in the direction X (i.e., the touch sensing electrode 120 may be arranged in the direction X and the direction Y to form an array), but not limited thereto.

In FIG. 1 and FIG. 2, the electronic panel 100 may include a plurality of touch signal lines 132 (the touch signal line 132 is a kind of signal line 130) electrically connected to the touch sensing electrodes 120, wherein a disposition of the touch signal lines 132 and an electrically connecting manner between the touch signal line 132 and the touch sensing electrode 120 may be designed based on requirement(s). In some embodiments (as shown in FIG. 1 and FIG. 2), the touch signal line 132 may extend along the direction Y and be arranged in the direction X, but not limited thereto. In some embodiments (as shown in FIG. 2), the touch sensing electrodes 120 and the touch signal lines 132 may be electrically connected to each other one-to-one, but not limited thereto. Since FIG. 2 only shows the first touch sensing electrode 122 and the second touch sensing electrode 124 of the touch sensing electrodes 120, a first touch signal line 132a included in the touch signal lines 132 is electrically connected to the first touch sensing electrode 122, and a second touch signal line 132b included in the touch signal lines 132 is electrically connected to the second touch sensing electrode 124. Note that more touch signal lines 132 may be included in the electronic panel 100 actually.

In FIG. 2, the touch sensing electrode 120 and the touch signal line 132 may belong to different conductive layers, and the touch signal line 132 may be electrically connected to the touch sensing electrode 120 through a connecting structure CS, but not limited thereto. For instance, the touch sensing electrode 120 may belong to a transparent conductive layer, and the touch signal line 132 may belong to a metal conductive layer, but not limited thereto.

In FIG. 1 and FIG. 2, one end of the touch signal line 132 is electrically connected to a driving circuit 140 having a function of driving the touch sensing electrode 120, and another end of the touch signal line 132 is electrically to a common signal source VSc. In FIG. 1, the driving circuit 140 may be disposed in the peripheral region PR.

In the present disclosure, the driving circuit 140 may include a plurality of output terminals 142, such that the driving circuit 140 may output signals to the electronic components connected to the output terminals 142 through these output terminals 142, wherein the number of the output terminals 142, the arrangement of the output terminals 142 and the types of the output terminals 142 may be designed based on requirement(s). As shown in FIG. 1, the plurality of output terminals 142 of the driving circuit 140 may include a plurality of first output terminals 142_1 configured to be electrically connected to the touch signal lines 132, such that the first output terminals 142_1 may be electrically connected to the touch sensing electrodes 120 through the touch signal lines 132. For instance, in FIG. 1, the first output terminals 142_1 may be arranged in the direction X to form a first output row 142r1, but not limited thereto.

In the present disclosure, the electronic panel 100 may include a first switching component 150 disposed in the peripheral region PR and electrically connected to the output terminals 142 of the driving circuit 140 and the signal lines 130 (e.g., the first switching component 150 is electrically connected to the output terminals 142 of the driving circuit 140 through a plurality of peripheral traces PL). As shown in FIG. 1, the first switching component 150 may be disposed between the driving circuit 140 and the active region AR, but not limited thereto. In the present disclosure, the number of the output terminals 142 electrically connected to the first switching component 150 may be less than the number of the signal lines 130 electrically connected to the first switching component 150, and therefore, the existence of the first switching component 150 may make the output terminals 142 with a smaller number be electrically connected to the signal lines 130 with a larger number. Namely, the existence of the first switching component 150 may reduce the number of the required output terminals 142 of the driving circuit 140, thereby reducing the size of the driving circuit 140 and/or the number of the required electronic components of the driving circuit 140 (e.g., the number of driving chips).

In some embodiments, the first switching component 150 may include a plurality of touch driving switching elements 152 (e.g., a first touch driving switching element 152a and a second touch driving switching element 152b shown in FIG. 2) electrically connected between the first output terminals 142_1 of the driving circuit 140 and the touch signal lines 132 (i.e., the first switching component 150 is electrically connected to the first output terminals 142_1 and the touch signal lines 132), and one first output terminal 142_1 of the driving circuit 140 may be connected to several of the touch driving switching elements 152 of the first switching component 150, such that this first output terminal 142_1 may be electrically connected to several of the touch signal lines 132 through being electrically connected to several of the touch driving switching elements 152. In an example shown in FIG. 2, one end of the first touch driving switching element 152a (e.g., a source electrode) and one end of the second touch driving switching element 152b (e.g., a source electrode) are electrically connected to the same first output terminal 142_1 of the driving circuit 140, another end of the first touch driving switching element 152a (e.g., a drain electrode) is electrically connected to the first touch signal line 132a, another end of the second touch driving switching element 152b (e.g., a drain electrode) is electrically connected to the second touch signal line 132b, and still another end of the first touch driving switching element 152a (e.g., a gate electrode) and still another end of the second touch driving switching element 152b (e.g., a gate electrode) are electrically connected to a switch controlling circuit (e.g., the switch controlling circuit includes a signal source VS1 and a signal source VS2). Thus, by controlling the switching states of the touch driving switching elements 152, the driving circuit 140 may provide the same signal or different signals to several of the touch sensing electrodes 120 through one first output terminal 142_1 and the first switching component 150, and the touch sensing electrodes 120 may be coupled to or disconnected from the driving circuit 140 at suitable time individually.

The number of the touch driving switching elements 152 may be designed based on requirement(s). For instance, the number of the touch driving switching elements 152 may be the same as the number of the touch signal lines 132, and the touch driving switching elements 152 and the touch signal lines 132 may be electrically connected to each other one-to-one.

Moreover, in FIG. 1, the first switching component 150 may optionally have a first subpart 150a, and the touch driving switching elements 152 may be disposed in the first subpart 150a.

In the present disclosure, the electronic panel 100 may include a second switching component 160 disposed in the peripheral region PR and electrically connected to the common signal source VSc and the touch signal lines 132. As shown in FIG. 1, the active region AR may be disposed between the first switching component 150 and the second switching component 160, but not limited thereto. In some embodiments, the second switching component 160 may include a plurality of common-signal switching elements 162 (e.g., a first common-signal switching element 162a and a second common-signal switching element 162b shown in FIG. 2), wherein the common-signal switching element 162 may be electrically connected between the touch signal line 132 and the common signal source VSc. In the example shown in FIG. 2, one end of the first common-signal switching element 162a (e.g., a drain electrode) and one end of the second common-signal switching element 162b (e.g., a drain electrode) is electrically connected to the common signal source VSc, another end of the first common-signal switching element 162a (e.g., a source electrode) is electrically connected to the first touch signal line 132a for being electrically connected to the first touch sensing electrode 122, another end of the second common-signal switching element 162b (e.g., a source electrode) is electrically connected to the second touch signal line 132b for being electrically connected to the second touch sensing electrode 124, and still another end of the first common-signal switching element 162a (e.g., a gate electrode) and still another end of the second common-signal switching element 162b (e.g., a gate electrode) are electrically connected to the switch controlling circuit (e.g., the switch controlling circuit includes a signal source VS0). Therefore, by controlling the switching state of the common-signal switching element 162, the touch sensing electrode 120 may be coupled to or disconnected from the common signal source VSc. In the present disclosure, the common signal source VSc may be split into multiple common signal source parts, such that one end of the first common-signal switching element 162a (e.g., a drain electrode) and one end of the second common-signal switching element 162b (e.g., a drain electrode) may be electrically connected to different common signal source parts respectively, and these common signal source parts provide the same common signal.

In the present disclosure, the size (e.g., the ratio of channel width to channel length (W/L)) of the common-signal switching element 162 may be designed based on requirement(s). In some embodiments, the size (e.g., the ratio of channel width to channel length (W/L)) of the common-signal switching element 162 may be related to the position of the touch sensing electrode 120 electrically connected to this the common-signal switching element 162. As shown in FIG. 2, the first touch sensing electrode 122 is separated from the first switching component 150 (or the driving circuit 140) by a first distance, the second touch sensing electrode 124 is separated from the first switching component 150 (or the driving circuit 140) by a second distance, and the first distance is greater than the second distance. In this condition, the size (e.g., the ratio of channel width to channel length (W/L)) of the first common-signal switching element 162a may be greater than or equal to the size (e.g., the ratio of channel width to channel length (W/L)) of the second common-signal switching element 162b.

Due to the positions of the touch sensing electrodes 120, different distances (e.g., the distance in the direction Y) between the first switching component 150 (or the driving circuit 140) and the touch sensing electrodes 120 exist. Thus, the parts of the touch signal lines 132 disposed between the first switching component 150 (or the driving circuit 140) and the connected touch sensing electrodes 120 have different lengths, and these lengths are related to the positions of the touch sensing electrodes 120. Accordingly, resistances between the first switching component 150 (or the driving circuit 140) and the touch sensing electrodes 120 are different (i.e., the resistance between the first switching component 150 and the touch sensing electrode 120 is increased as the distance between this first switching component 150 and this touch sensing electrode 120 is increased). In some conditions, the resistance difference may affect the driving consistency of the touch sensing electrodes 120 caused by the driving circuit 140. Therefore, by appropriately designing and adjusting the common-signal switching elements 162 electrically connected to the touch signal lines 132, the driving capabilities of the driving circuit 140 driving the touch sensing electrodes 120 at different positions are the same or similar. For instance, the size (e.g., the ratio of channel width to channel length (W/L)) of the first common-signal switching element 162a may be greater than the size (e.g., the ratio of channel width to channel length (W/L)) of the second common-signal switching element 162b.

Figure 3:
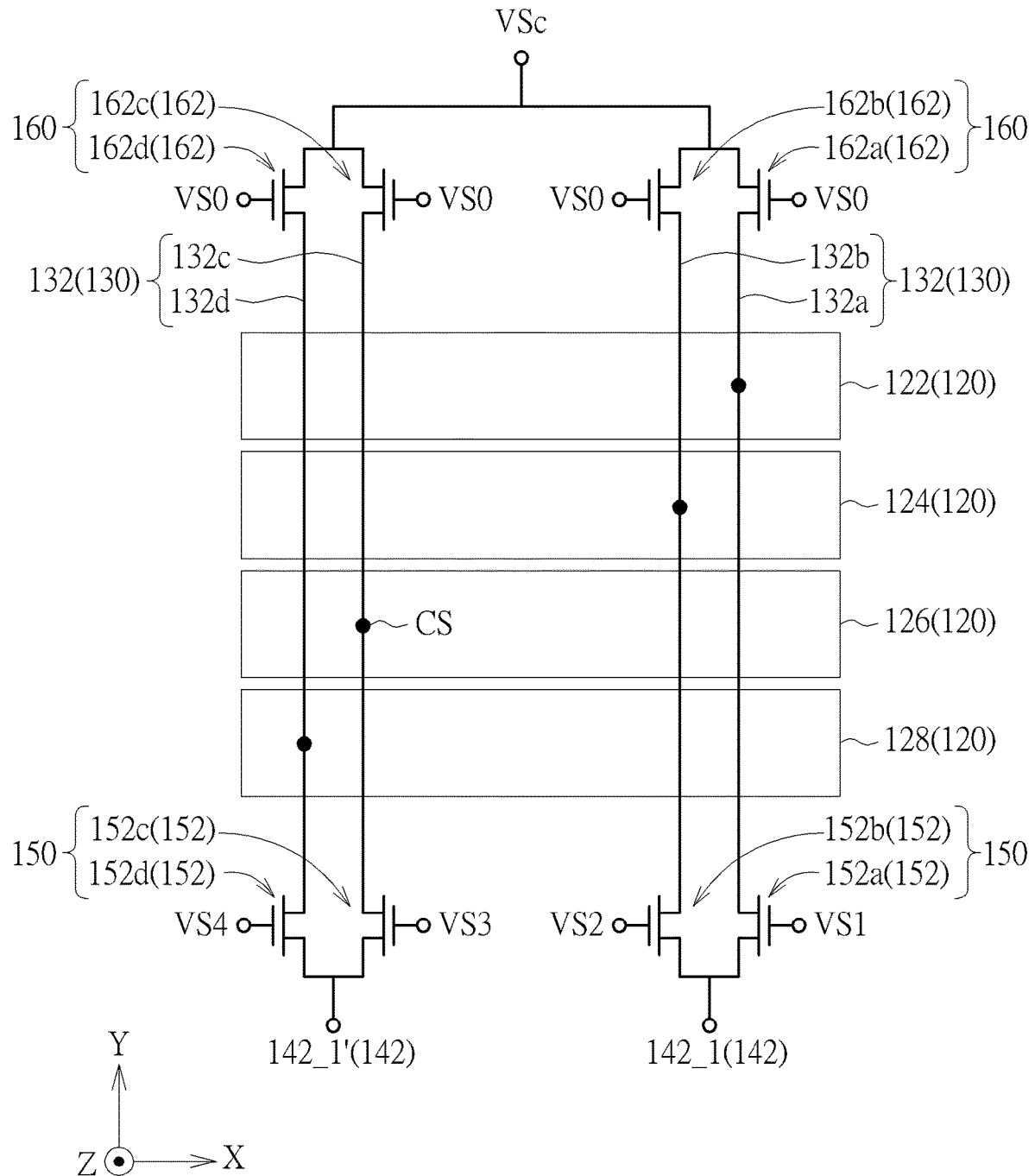
FIG. 3 is a schematic diagram showing electrodes, signal lines and switching components of the electronic panel according to the first embodiment of the present disclosure.

Similarly, compared with FIG. 2, FIG. 3 further shows a third touch sensing electrode 126 and a fourth touch sensing electrode 128 which belong to the touch sensing electrodes 120, a third touch signal line 132c and a fourth touch signal line 132d which belong to the touch signal lines 132, a third touch driving switching element 152c and a fourth touch driving switching element 152d which belong to the touch driving switching elements 152, a third common-signal switching element 162c and a fourth common-signal switching element 162d which belong to the common-signal switching elements 162 and another first output terminal 142_1'. Similarly, in the connections, the third touch sensing electrode 126 is electrically connected to the third touch signal line 132c, the third touch signal line 132c is electrically connected between the third touch driving switching element 152c and the third common-signal switching element 162c, the fourth touch sensing electrode 128 is electrically connected to the fourth touch signal line 132d, the fourth touch signal line 132d is electrically connected between the fourth touch driving switching element 152d and the fourth common-signal switching element 162d, the third touch driving switching element 152c and the fourth touch driving switching element 152d are electrically connected to another first output terminal 142_1', and the third common-signal switching element 162c and the fourth common-signal switching element 162d are electrically connected to the common signal source VSc. The switching state of the third touch driving switching element 152c, the switching state of the fourth touch driving switching element 152d, the switching state of the third common-signal switching element 162c and the switching state of the fourth common-signal switching element 162d may be controlled by the switch controlling circuit (e.g., the switch controlling circuit includes a signal source VS3, a signal source VS4 and a signal source VS0). In FIG. 3, the third touch sensing electrode 126 is separated from the first switching component 150 (or the driving circuit 140) by a third distance, and the fourth touch sensing electrode 128 is separated from the first switching component 150 (or the driving circuit 140) by a fourth distance, wherein the first distance is greater than the second distance, the second distance is greater than the third distance, and the third distance is greater than the fourth distance. In this condition, the size (e.g., the ratio of channel width to channel length (W/L)) of the first common-signal switching element 162a may be greater than or equal to the size (e.g., the ratio of channel width to channel length (W/L)) of the second common-signal switching element 162b, the size (e.g., the ratio of channel width to channel length (W/L)) of the second common-signal switching element 162b may be greater than or equal to the size (e.g., the ratio of channel width to channel length (W/L)) of the third common-signal switching element 162c, and the size (e.g., the ratio of channel width to channel length (W/L)) of the third common-signal switching element 162c may be greater than or equal to the size (e.g., the ratio of channel width to channel length (W/L)) of the fourth common-signal switching element 162d.

In some embodiments, the first switching component 150 and the second switching component 160 of the electronic panel 100 may include the conductive layer(s), the insulating layer(s) and the semiconductor layer(s) of the electronic panel 100 (the material of the conductive layer, the material of the insulating layer and the material of the semiconductor layer are described above). For instance, the touch driving switching element 152 may include at least two conductive layers, one semiconductor layer and the insulating layer(s) between them, and the common-signal switching element 162 may include at least two conductive layers, one semiconductor layer and the insulating layer(s) between them, but not limited thereto.

In the present disclosure, the electronic panel 100 may include suitable component(s) and structure(s), so as to make the electronic panel 100 include a non-self-luminous type display panel or a self-luminous type display panel, thereby implementing the displaying function of the electronic panel 100. In the following, the electronic panel 100 includes a non-self-luminous type display panel for example.

In the present disclosure, the active region AR of the electronic panel 100 may include a plurality of pixels, and each pixel may include at least one sub-pixel, wherein the pixel is a displaying unit of the electronic panel 100. In some embodiments, if the electronic panel 100 includes a color display panel, one pixel may include a plurality of sub-pixels for instance (e.g., a green sub-pixel, a red sub-pixel and a blue sub-pixel), but not limited thereto (the number and color of the sub-pixel(s) included in the pixel may be adjusted based on requirement(s)). In some embodiments, if the electronic panel 100 includes a monochrome display panel, one pixel may include one sub-pixel for instance, but not limited thereto. Furthermore, the arrangement of the pixels and/or the arrangement of the sub-pixels may be designed based on requirement(s).

The electronic panel 100 may include a display medium layer, a backlight module and other suitable component, wherein the backlight module may be configured to provide backlight, and the display medium layer may include any suitable display medium material (e.g., liquid crystal molecules). For instance, the substrate 110 may be disposed between the display medium layer and the backlight module, and the display medium layer may be disposed between the substrate 110 and the opposite substrate.

Correspondingly, the electronic panel 100 may further include electronic component(s) configured to control the display medium layer. In some embodiments, the electronic panel 100 may include a plurality of pixel electrodes disposed in the sub-pixels of the active region AR. In one sub-pixel of the electronic panel 100, the status of the display medium materials in the display medium layer may be correspondingly adjusted based on a signal received by the pixel electrode in this sub-pixel (e.g., a data signal or a signal related to the data signal), so as to adjust the light transmittance of this sub-pixel, thereby making the light intensity of the backlight passing through this sub-pixel be corresponding to the data signal.

In addition, the touch sensing electrode 120 of the electronic panel 100 may receive the common signal to serve as a common electrode when displaying an image, such that the status of the display medium materials in the display medium layer may be controlled by an electric field caused by the pixel electrode and the touch sensing electrode 120.

The electronic panel 100 may further include other electronic components disposed in the sub-pixels of the active region AR, so as to form a sub-pixel circuit in the sub-pixel. In some embodiments, the electronic panel 100 may include a plurality of pixel switching elements, and may optionally include a plurality of capacitors. In one sub-pixel, at least one pixel switching element may be disposed in this sub-pixel, at least one capacitor may be optionally disposed in this sub-pixel, and the pixel switching element(s), the capacitor(s) (optionally) and the pixel electrode may be electrically connected to each other to form the sub-pixel circuit. The number of the pixel switching element(s) and the number of the capacitor(s) included in one sub-pixel may be designed based on requirement(s), and the sub-pixel circuit may be designed based on requirement(s) also.

The electronic panel 100 may further include a plurality of pixel signal lines (the pixel signal line is a kind of signal line 130) configured to transmit the data signals, wherein the pixel signal lines may be electrically connected to the pixel switching elements in the sub-pixels, such that the signals received by the pixel electrodes may be corresponding to the data signals transmitted by the pixel signal lines (e.g., the signal received by the pixel electrode may be the data signal or the signal related to the data signal). In some embodiments, the pixel signal line may be electrically connected to the pixel electrode through the pixel switching element, but not limited thereto.

The electronic panel 100 may further include a plurality of scan lines electrically connected to the pixel switching elements in the sub-pixels and configured to transmit switching signals, wherein the switching states of the pixel switching elements electrically connected to the scan lines may be controlled by the switching signals.

In the present disclosure, the dispositions of the pixel signal lines and the scan lines may be designed based on requirement(s). In some embodiments, the pixel signal line may extend along the direction Y and be arranged in the direction X, but not limited thereto. In some embodiments, the scan line may extend along the direction X and be arranged in the direction Y, but not limited thereto.

In the present disclosure, the electronic components such as the pixel electrodes, the pixel switching elements, the pixel signal lines, the scan lines, the capacitors may individually include the conductive layer(s), the insulating layer(s), the semiconductor layer or a combination thereof (the material of the conductive layer, the material of the insulating layer and the material of the semiconductor layer are described above). For instance, the pixel electrode may include a transparent conductive layer, the pixel switching element may include at least two metal conductive layers, one semiconductor layer and the insulating layer(s) between them, the pixel signal line may include a metal conductive layer, and the scan line may include a metal conductive layer different from the pixel signal line, but not limited thereto. Note that the pixel signal line and the touch signal line 132 may belong to different conductive layers. Note that FIG. 1 does not show the pixel signal line belonging to the signal lines 130.

In the present disclosure, the pixel signal line may be electrically connected to the driving circuit 140, so as to receive the signal provided from the driving circuit 140. As shown in FIG. 1, the plurality of output terminals 142 of the driving circuit 140 may include a plurality of second output terminals 142_2 configured to be electrically connected to the pixel signal lines. For example, in FIG. 1, the second output terminals 142_2 may be arranged in the direction X to form a second output row 142r2, but not limited thereto.

In the present disclosure, the connections between the pixel signal lines and the second output terminals 142_2 of the driving circuit 140 may be designed based on requirement(s). In some embodiments, the first switching component 150 may include a plurality of display driving switching elements electrically connected between the pixel signal lines and the second output terminals 142_2 of the driving circuit 140 (i.e., the first switching component 150 is electrically connected to the second output terminals 142_2 and the pixel signal lines), and one of the second output terminals 142_2 of the driving circuit 140 may be electrically connected to several of the display driving switching elements of the first switching component 150, such that this second output terminal 142_2 may be electrically connected to several of the pixel signal lines through being electrically connected to several of the display driving switching elements. For instance, each of some display driving switching elements may have one end (e.g., a source electrode) electrically connected to the same second output terminal 142_2 of the driving circuit 140, each of some display driving switching elements may have another end (e.g., a drain electrode) respectively electrically connected to different pixel signal lines (e.g., the display driving switching elements and the pixel signal lines may be electrically connected to each other one-to-one), and each of some display driving switching elements may have still another end (e.g., a gate electrode) electrically connected to the switch controlling circuit, but not limited thereto. Thus, by controlling the switching states of the display driving switching elements, the driving circuit 140 may provide the same signal or different signals to several of the pixel signal lines through one second output terminal 142_2 and the first switching component 150, and the pixel signal lines may be coupled to or disconnected from the driving circuit 140 at suitable time individually. Moreover, in FIG. 1, the first switching component 150 may optionally include have a second subpart 150b, wherein the display driving switching elements may be disposed in the second subpart 150b. For instance, in FIG. 1, the second subpart 150b may be disposed between the first subpart 150a and the active region AR, but not limited thereto.

In some embodiments, the pixel signal lines may be electrically connected to the second output terminals 142_2 of the driving circuit 140, and the pixel signal lines and the second output terminals 142_2 may be electrically connected to each other one-to-one, but not limited thereto.

Moreover, the driving circuit 140 may be one electronic component or a combination of a plurality of electronic components. In some embodiments, the driving circuit 140 may include at least one driving chip. For instance, as shown in FIG. 1, the driving circuit 140 may include one driving chip configured to provide the required signals to the touch signal lines 132 and the pixel signal lines (i.e., a touch sensing driver and a display driver may be integrated in this driving chip), but not limited thereto. For instance (not shown in figures), the driving circuit 140 may include a plurality of driving chips configured to respectively provide the required signals to the touch signal lines 132 and the pixel signal lines, but not limited thereto.

Figure 4:
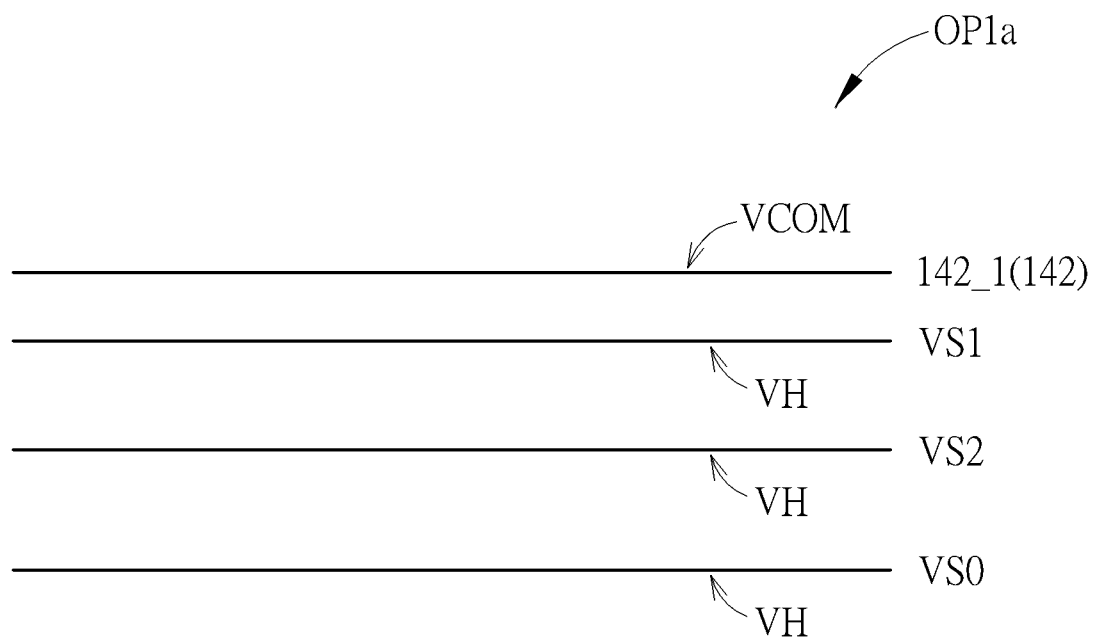
FIG. 4 is a schematic diagram showing an example of signals of a driving method of the electronic panel in a first mode according to the first embodiment of the present disclosure.
Figure 5:
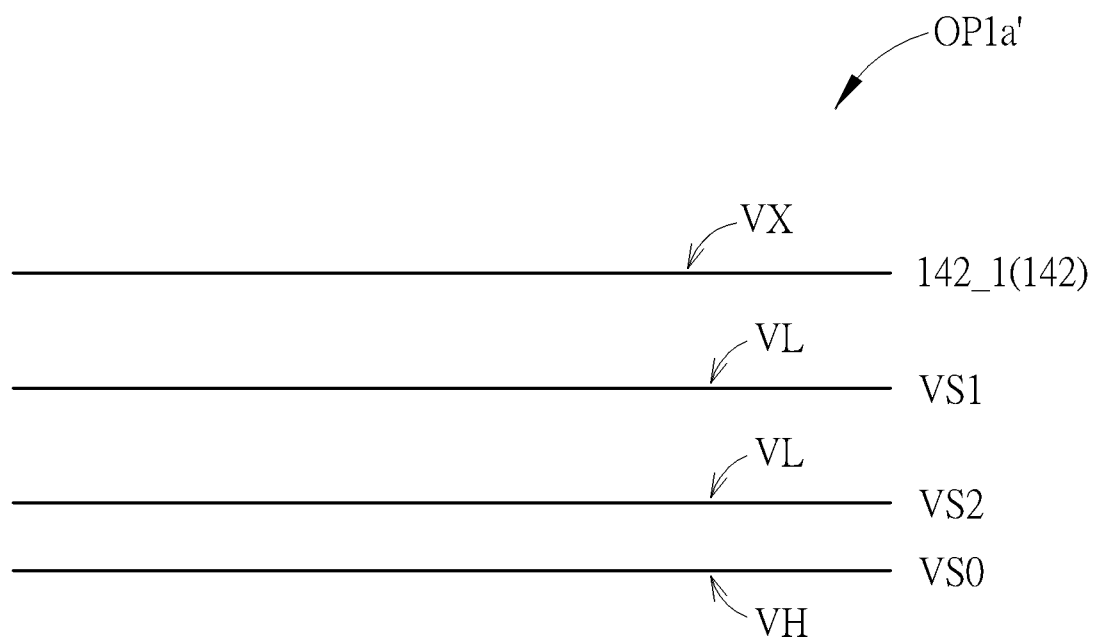
FIG. 5 is a schematic diagram showing an example of signals of another driving method of the electronic panel in the first mode according to the first embodiment of the present disclosure.
Figure 6:
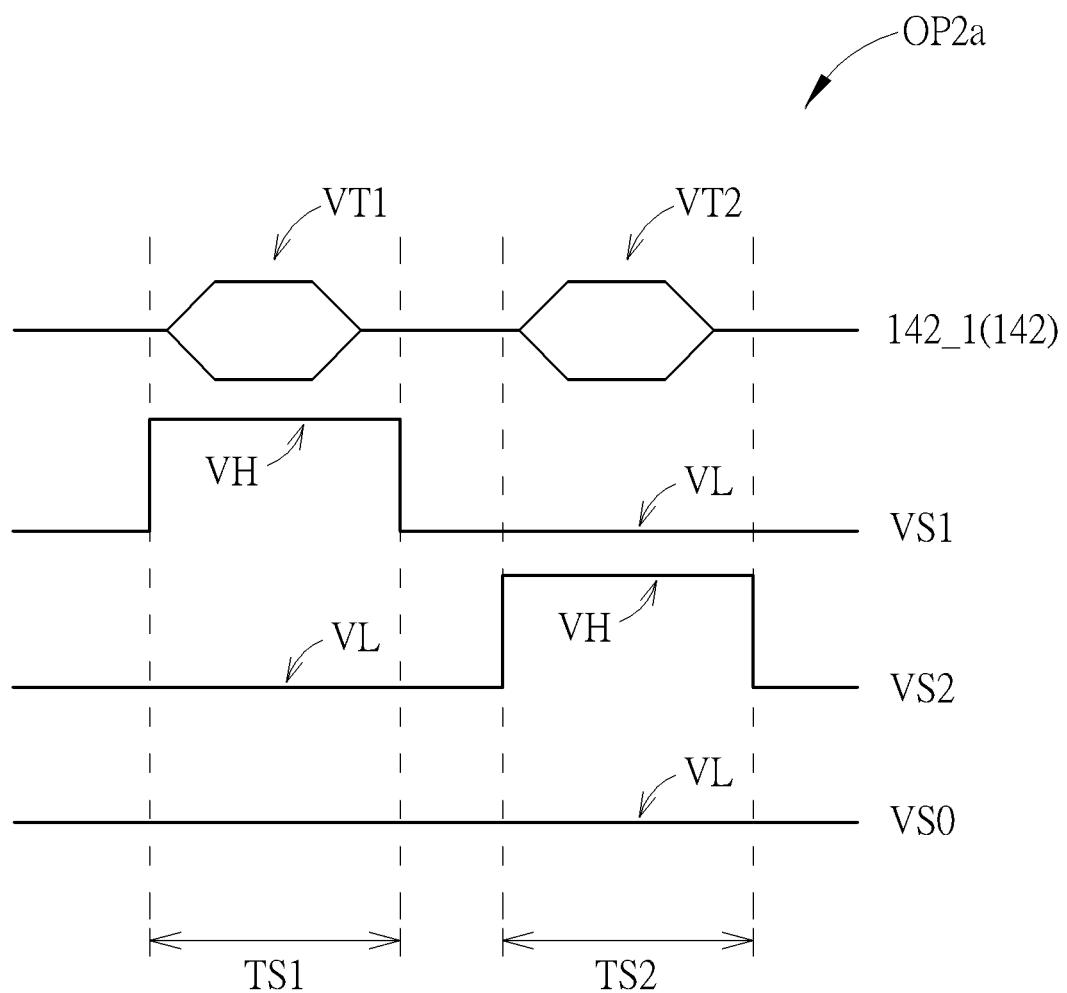
FIG. 6 is a schematic diagram showing an example of signals of a driving method of the electronic panel in a second mode according to the first embodiment of the present disclosure.

Referring to FIG. 4 to FIG. 6, and further referring to FIG. 1 and FIG. 2, FIG. 4 is a schematic diagram showing an example of signals of a driving method of the electronic panel in a first mode according to the first embodiment of the present disclosure, FIG. 5 is a schematic diagram showing an example of signals of another driving method of the electronic panel in the first mode according to the first embodiment of the present disclosure, and FIG. 6 is a schematic diagram showing an example of signals of a driving method of the electronic panel in a second mode according to the first embodiment of the present disclosure, wherein the circuit shown in FIG. 2 may be operated by the signals shown in FIG. 4 to FIG. 6. In the present disclosure, the electronic panel 100 may be operated in a first mode or a second mode, the first mode is configured to perform the displaying function (i.e., the first mode is also referred as a display mode), and the second mode is configured to perform the touch sensing function (i.e., the second mode is also referred as a touch sensing mode).

When the electronic panel 100 is operated in the first mode, the touch sensing electrodes 120 and the touch signal lines 132 may receive the common signal, and the driving circuit 140 may provide the corresponding data signals to the pixel signal lines through the second output terminals 142_2 (i.e., the pixel electrodes receive the data signals or the signals related to the data signals), such that the status of the display medium materials in the display medium layer may be controlled by the electric field caused by the pixel electrodes and the touch sensing electrodes 120, thereby displaying an image. When the electronic panel 100 is operated in the second mode, the driving circuit 140 may not provide the signals to the pixel signal lines, and the driving circuit 140 may provide the touch sensing signals to the touch signal lines 132 through the first output terminals 142_1, so as to make the touch sensing electrodes 120 perform the touch sensing function.

As shown in FIG. 2 and FIG. 4, in a driving method OP1a of the first mode, the first output terminal 142_1 of the driving circuit 140 may provide the common signal VCOM, the signal source VS1 controlling the switching state of the first touch driving switching element 152a and the signal source VS2 controlling the switching state of the second touch driving switching element 152b may provide turn-on signals (e.g., high voltages VH) to turn on the first touch driving switching element 152a and the second touch driving switching element 152b, and the signal source VS0 controlling the switching states of the first common-signal switching element 162a and the second common-signal switching element 162b may provide a turn-on signal (e.g., a high voltage VH) to turn on the first common-signal switching element 162a and the second common-signal switching element 162b, such that the first touch sensing electrode 122 and the second touch sensing electrode 124 may receive the common signal VCOM from the driving circuit 140 and the common signal source VSc. Therefore, in the driving method OP1a of the first mode, the first switching component 150 may couple the first output terminal 142_1 of the driving circuit 140 to the first touch sensing electrode 122 and the second touch sensing electrode 124 simultaneously, and the second switching component 160 may couple the common signal source VSc to the first touch sensing electrode 122 and the second touch sensing electrode 124 simultaneously. Moreover, in the first mode, if the pixel signal lines are electrically connected to the second output terminals 142_2 of the driving circuit 140 through the second subpart 150b of the first switching component 150, the display driving switching elements of the second subpart 150b are turned on in different timing sequences in the first mode, such that the driving circuit 140 provides the suitable data signals to the pixel signal lines through the second output terminals 142_2.

As shown in FIG. 2 and FIG. 5, in another driving method OP1a' of the first mode, the first output terminal 142_1 of the driving circuit 140 may provide any suitable signal VX, the signal source VS1 controlling the switching state of the first touch driving switching element 152a and the signal source VS2 controlling the switching state of the second touch driving switching element 152b may provide turn-off signals (e.g., low voltages VL) to turn off the first touch driving switching element 152a and the second touch driving switching element 152b, and the signal source VS0 controlling the switching states of the first common-signal switching element 162a and the second common-signal switching element 162b may provide a turn-on signal (e.g., a high voltage VH) to turn on the first common-signal switching element 162a and the second common-signal switching element 162b, such that the first touch sensing electrode 122 and the second touch sensing electrode 124 may receive the common signal VCOM from the common signal source VSc and may not receive the signal VX provided from the driving circuit 140. Therefore, in the driving method OP1a' of the first mode, the first switching component 150 may disconnect the first output terminal 142_1 of the driving circuit 140 from the first touch sensing electrode 122 and the second touch sensing electrode 124, and the second switching component 160 may couple the common signal source VSc to the first touch sensing electrode 122 and the second touch sensing electrode 124 simultaneously. Similarly, in the first mode, if the pixel signal lines are electrically connected to the second output terminals 142_2 of the driving circuit 140 through the second subpart 150b of the first switching component 150, the display driving switching elements of the second subpart 150b are turned on in different timing sequences in the first mode, such that the driving circuit 140 provides the suitable data signals to the pixel signal lines through the second output terminals 142_2.

As shown in FIG. 2 and FIG. 6, in a driving method OP2a of the second mode, the second mode may be divided into a plurality of timing sequences according to the number of the touch driving switching elements 152 electrically connected to the same first output terminal 142_1 for performing the touch sensing function. In a timing sequence TS1, the first output terminal 142_1 of the driving circuit 140 may provide a touch sensing signal VT1 corresponding to the first touch sensing electrode 122, the signal source VS1 controlling the switching state of the first touch driving switching element 152a may provide a turn-on signal (e.g., a high voltage VH) to turn on the first touch driving switching element 152a, the signal source VS2 controlling the switching state of the second touch driving switching element 152b may provide a turn-off signal (e.g., a low voltage VL) to turn off the second touch driving switching element 152b, and the signal source VS0 controlling the switching states of the first common-signal switching element 162a and the second common-signal switching element 162b may provide a turn-off signal (e.g., a low voltage VL) to turn off the first common-signal switching element 162a and the second common-signal switching element 162b, such that the first touch sensing electrode 122 may receive the touch sensing signal VT1 from the driving circuit 140, and the second touch sensing electrode 124 may not receive the signal provided from the driving circuit 140. In a timing sequence TS2, the first output terminal 142_1 of the driving circuit 140 may provide a touch sensing signal VT2 corresponding to the second touch sensing electrode 124, the signal source VS1 controlling the switching state of the first touch driving switching element 152a may provide a turn-off signal (e.g., a low voltage VL) to turn off the first touch driving switching element 152a, the signal source VS2 controlling the switching state of the second touch driving switching element 152b may provide a turn-on signal (e.g., a high voltage VH) to turn on the second touch driving switching element 152b, and the signal source VS0 controlling the switching states of the first common-signal switching element 162a and the second common-signal switching element 162b may provide a turn-off signal (e.g., a low voltage VL) to turn off the first common-signal switching element 162a and the second common-signal switching element 162b, such that the second touch sensing electrode 124 may receive the touch sensing signal VT2 from the driving circuit 140, and the first touch sensing electrode 122 may not receive the signal provided from the driving circuit 140. Therefore, in the driving method OP2a of the second mode, the first switching component 150 may couple the first output terminal 142_1 of the driving circuit 140 to the first touch sensing electrode 122 and disconnect the first output terminal 142_1 of the driving circuit 140 from the second touch sensing electrode 124 in the timing sequence TS1, the first switching component 150 may couple the first output terminal 142_1 of the driving circuit 140 to the second touch sensing electrode 124 and disconnect the first output terminal 142_1 of the driving circuit 140 from the first touch sensing electrode 122 in the timing sequence TS2, and the second switching component 160 may disconnect the common signal source VSc from the first touch sensing electrode 122 and the second touch sensing electrode 124 in the second mode.

According to the above driving methods, the driving effect of the common signal VCOM provided from the driving circuit 140 and/or the common signal source VSc on the touch sensing electrodes 120 may be improved in the first mode, so as to enhance the displaying effect of the electronic panel 100. According to the above driving methods, the common signal source VSc is disconnected from the touch sensing electrodes 120 to prevent the common signal source VSc from affecting the touch sensing electrodes 120 in the second mode, thereby preventing the common signal source VSc from affecting the touch sensing function.

The electronic panel 100 may further include other suitable components and structures based on requirement(s), so as to make the electronic panel 100 have the good displaying function and the good touch sensing function. In some embodiments, the electronic panel 100 may further include a color converting layer configured to convert (or filter) the color of the light passing through the color converting layer into required color. For instance, the color converting layer may include color filter, quantum dots material, fluorescence material, phosphorescence material, other suitable material (s) or a combination thereof. For instance, if the electronic panel 100 includes a color display panel, the color converting layer may have a plurality of color converting parts corresponding to different colors (e.g., a green converting part, a red converting part and a blue converting part).

In some embodiments, the electronic panel 100 may further include a light shielding layer configured to divide the sub-pixels and shield some components, so as to reduce the probability that the external light is reflected by the electronic panel 100, thereby increasing the display quality. For example, the light shielding layer may include metal, photoresist, ink, resin, pigment, other suitable light shielding material(s) or a combination thereof, but not limited thereto.

In some embodiments, the electronic panel 100 may further include an optical layer, such as a polarizer and/or an anti-reflection film, disposed at any suitable position, but not limited thereto.

The electronic panel of the present disclosure is not limited to the above embodiments. Further embodiments of the present disclosure are described below. For ease of comparison, same components will be labeled with the same symbol in the following. The following descriptions relate the differences between each of the embodiments, and repeated parts will not be redundantly described.

Figure 7:
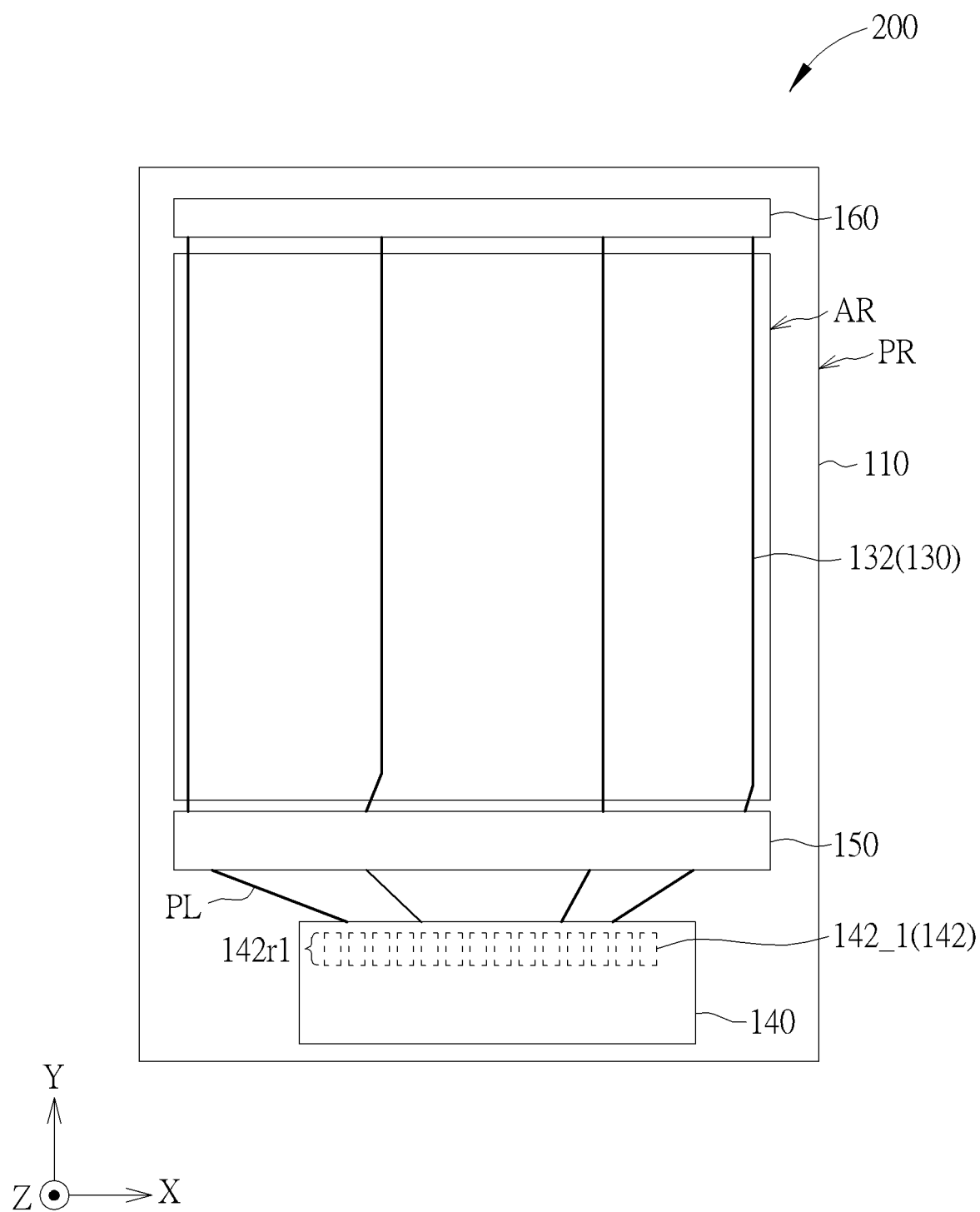
FIG. 7 is a schematic diagram showing a top view of an electronic panel according to a second embodiment of the present disclosure.
Figure 8:
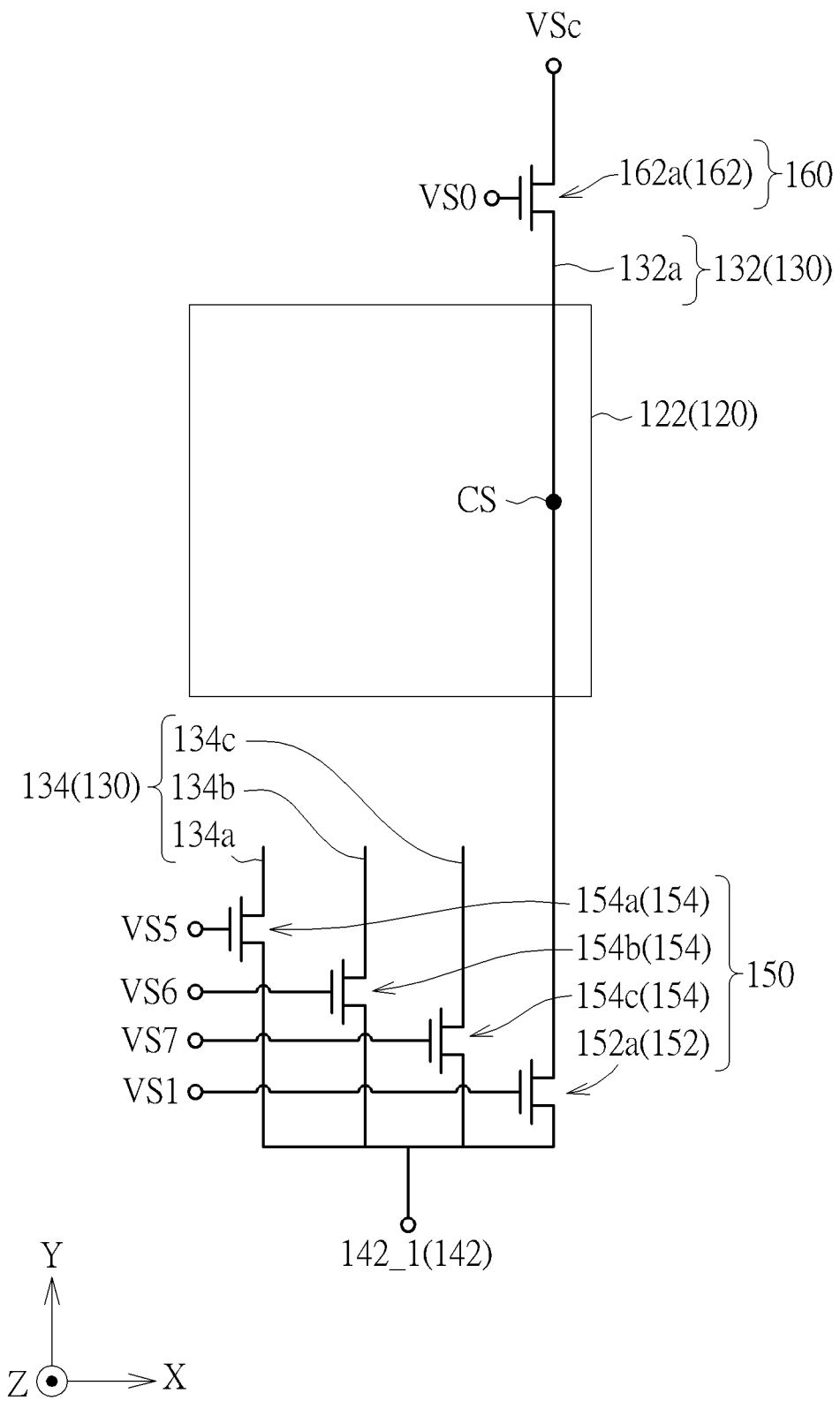
FIG. 8 is a schematic diagram showing electrodes, signal lines and switching components of the electronic panel according to the second embodiment of the present disclosure.

Referring to FIG. 7 and FIG. 8, FIG. 7 is a schematic diagram showing a top view of an electronic panel according to a second embodiment of the present disclosure, and FIG. 8 is a schematic diagram showing electrodes, signal lines and switching components of the electronic panel according to the second embodiment of the present disclosure. As shown in FIG. 7 and FIG. 8, differences between the first embodiment and this embodiment are the design of the first switching component 150 and the connecting relation between the first switching component 150 and the driving circuit 140. In FIG. 7 and FIG. 8, the first output terminals 142_1 of the driving circuit 140 of the electronic panel 200 may provide the touch sensing signals related to the touch sensing function and the data signals related to the displaying function based on requirement(s), and at least one of the touch driving switching elements 152 and at least one of the display driving switching elements 154 of the first switching component 150 may be electrically connected to the same first output terminal 142_1. For instance, in FIG. 8, one touch driving switching element 152 (e.g., the first touch driving switching element 152a) and three display driving switching elements 154 (e.g., a first display driving switching element 154a, a second display driving switching element 154b and a third display driving switching element 154c) may be electrically connected to the same first output terminal 142_1, wherein the first touch driving switching element 152a may be electrically connected to the first touch sensing electrode 122 through the first touch signal line 132a, the first display driving switching element 154a may be electrically connected to a first pixel signal line 134a belonging to the pixel signal lines 134 and related to a red sub-pixel, the second display driving switching element 154b may be electrically connected to a second pixel signal line 134b belonging to the pixel signal lines 134 and related to a green sub-pixel, and the third display driving switching element 154c may be electrically connected to a third pixel signal line 134*c* belonging to the pixel signal lines 134 and related to a blue sub-pixel, but not limited thereto. Similar to the first embodiment, the first common-signal switching element 162*a* the second switching component 160 may be electrically connected to the common signal source VSc, and the first common-signal switching element 162*a* may be electrically connected to the first touch sensing electrode 122 through the first touch signal line 132*a*.

Figure 9:
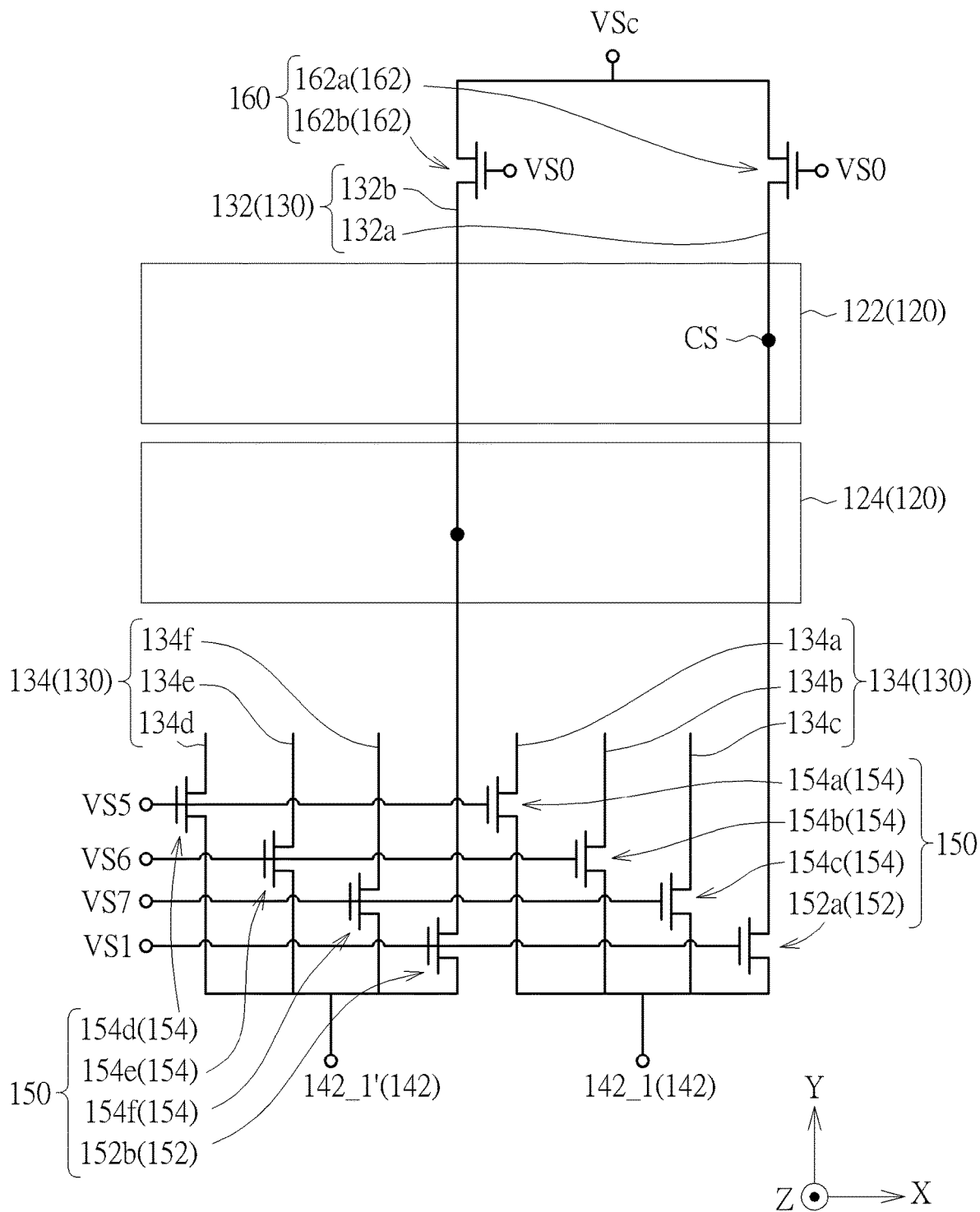
FIG. 9 is a schematic diagram showing electrodes, signal lines and switching components of the electronic panel according to the second embodiment of the present disclosure.

Similarly, compared with FIG. 8, FIG. 9 further shows a second touch sensing electrode 124 belonging to the touch sensing electrodes 120, a second touch signal line 132*b* belonging to the touch signal lines 132, a fourth pixel signal line 134*d*, a fifth pixel signal line 134*e* and a sixth pixel signal line 134*f* which belong to the pixel signal lines 134, a second touch driving switching element 152*b* belonging to the touch driving switching elements 152, a fourth display driving switching element 154*d*, a fifth display driving switching element 154*e* and a sixth display driving switching element 154*f* which belong to the display driving switching elements 154, a second common-signal switching element 162*b* belonging to the common-signal switching elements 162 and another first output terminal 142_1'. Similarly, in the connections, the second touch driving switching element 152*b*, the fourth display driving switching element 154*d*, the fifth display driving switching element 154*e* and the sixth display driving switching element 154*f* may be electrically connected to the same first output terminal 142_1', the second touch driving switching element 152*b* may be electrically connected to the second touch sensing electrode 124 through the second touch signal line 132*b*, the fourth display driving switching element 154*d* may be electrically connected to the fourth pixel signal line 134*d* related to a red sub-pixel, the fifth display driving switching element 154*e* may be electrically connected to the fifth pixel signal line 134*e* related to a green sub-pixel, the sixth display driving switching element 154*f* may be electrically connected to the sixth pixel signal line 134*f* related to a blue sub-pixel, the second common-signal switching element 162*b* may be electrically connected to the common signal source VSc, and the second common-signal switching element 162*b* may be electrically connected to the second touch sensing electrode 124 through the second touch signal line 132*b*.

According to the aforementioned connection, the existence of the first switching component 150 may make the output terminals 142 of the driving circuit 140 with a smaller number be electrically connected to the signal lines 130 with a larger number. Thus, the existence of the first switching component 150 may reduce the number of the required output terminals 142 of the driving circuit 140, thereby reducing the size of the driving circuit 140 and/or the number of the required electronic components of the driving circuit 140.

Figure 10:
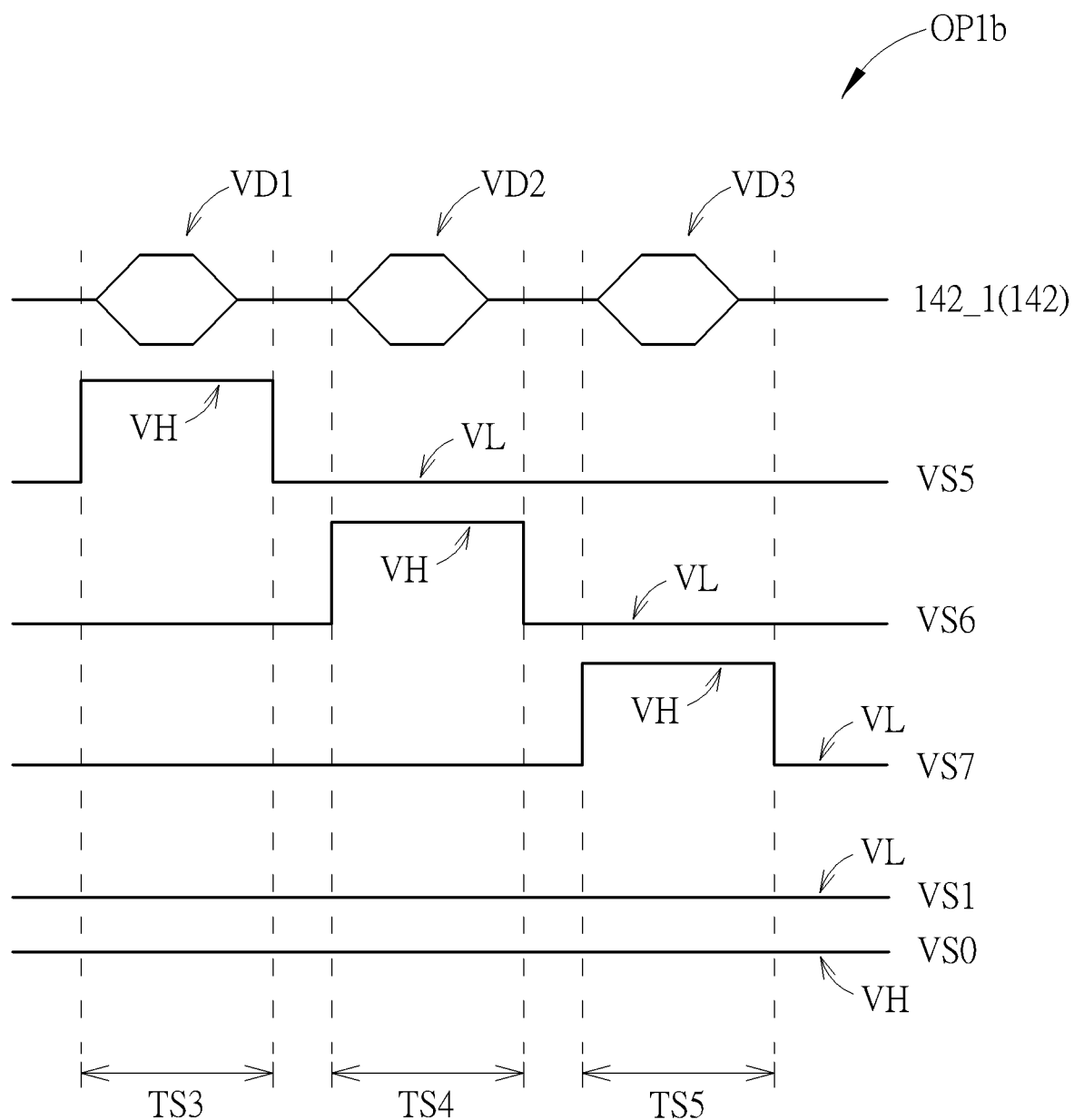
FIG. 10 is a schematic diagram showing an example of signals of a driving method of the electronic panel in the first mode according to the second embodiment of the present disclosure.
Figure 11:
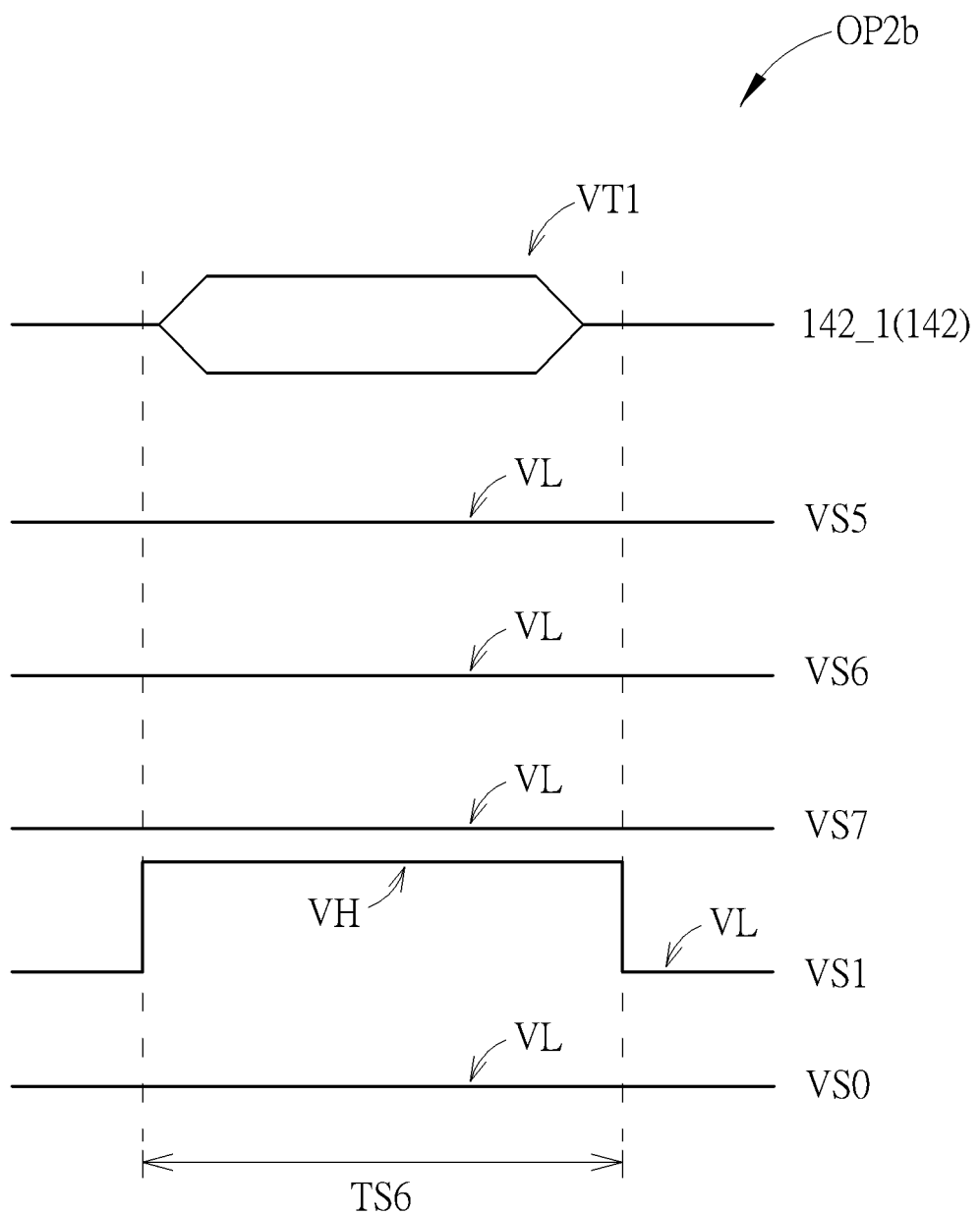
FIG. 11 is a schematic diagram showing an example of signals of a driving method of the electronic panel in the second mode according to the second embodiment of the present disclosure.

Referring to FIG. 10 and FIG. 11, FIG. 10 is a schematic diagram showing an example of signals of a driving method of the electronic panel in the first mode according to the second embodiment of the present disclosure, and FIG. 11 is a schematic diagram showing an example of signals of a driving method of the electronic panel in the second mode according to the second embodiment of the present disclosure, wherein the circuit shown in FIG. 8 may be operated by the signals shown in FIG. 10 and FIG. 11.

As shown in FIG. 8 and FIG. 10, in a driving method OP1*b* of the first mode, the first mode may be divided into a plurality of timing sequences according to the number of the display driving switching elements 154 electrically connected to the same first output terminal 142_1 for performing the displaying function. Signals in a timing sequence TS3 are described in the following. The first output terminal 142_1 of the driving circuit 140 may provide a data signal VD1 corresponding to the red sub-pixel. A signal source VS5 controlling the switching state of the first display driving switching element 154*a* may provide a turn-on signal (e.g., a high voltage VH) to turn on the first display driving switching element 154*a*. A signal source (e.g., the signal source VS1) controlling the switching state of the touch driving switching element 152 (e.g., the first touch driving switching element 152*a*), a signal source VS6 controlling the switching state of the second display driving switching element 154*b* and a signal source VS7 controlling the switching state of the third display driving switching element 154*c* may provide turn-off signals (e.g., low voltages VL) to turn off these switching elements. The signal source VS0 controlling the switching state of the common-signal switching element 162 (e.g., the first common-signal switching element 162*a*) may provide a turn-on signal (e.g., a high voltage VH) to turn on the common-signal switching element 162 (e.g., the first common-signal switching element 162*a*). Therefore, the touch sensing electrode 120 (e.g., the first touch sensing electrode 122) may receive the common signal from the common signal source VSc, and the first pixel signal line 134*a* may receive the data signal VD1 corresponding to the red sub-pixel.

Signals in a timing sequence TS4 are described in the following. The first output terminal 142_1 of the driving circuit 140 may provide a data signal VD2 corresponding to the green sub-pixel. The signal source VS6 controlling the switching state of the second display driving switching element 154*b* may provide a turn-on signal (e.g., a high voltage VH) to turn on the second display driving switching element 154*b*. The signal source (e.g., the signal source VS1) controlling the switching state of the touch driving switching element 152 (e.g., the first touch driving switching element 152*a*), the signal source VS5 controlling the switching state of the first display driving switching element 154*a* and the signal source VS7 controlling the switching state of the third display driving switching element 154*c* may provide turn-off signals (e.g., low voltages VL) to turn off these switching elements. The signal source VS0 controlling the switching state of the common-signal switching element 162 (e.g., the first common-signal switching element 162*a*) may provide a turn-on signal (e.g., a high voltage VH) to turn on the common-signal switching element 162 (e.g., the first common-signal switching element 162*a*). Therefore, the touch sensing electrode 120 (e.g., the first touch sensing electrode 122) may receive the common signal from the common signal source VSc, and the second pixel signal line 134*b* may receive the data signal VD2 corresponding to the green sub-pixel.

Signals in a timing sequence TS5 are described in the following. The first output terminal 142_1 of the driving circuit 140 may provide a data signal VD3 corresponding to the blue sub-pixel. The signal source VS7 controlling the switching state of the third display driving switching element 154*c* may provide a turn-on signal (e.g., a high voltage VH) to turn on the third display driving switching element 154*c*. The signal source (e.g., the signal source VS1) controlling the switching state of the touch driving switching element 152 (e.g., the first touch driving switching element 152*a*), the signal source VS5 controlling the switching state of the first display driving switching element 154*a* and the signal source VS6 controlling the switching state of the second display driving switching element 154*b* may provide turn-off signals (e.g., low voltages VL) to turn off these switching elements. The signal source VS0 controlling the switching state of the common-signal switching element 162 (e.g., the first common-signal switching element 162a) may provide a turn-on signal (e.g., a high voltage VH) to turn on the common-signal switching element 162 (e.g., the first common-signal switching element 162a). Therefore, the touch sensing electrode 120 (e.g., the first touch sensing electrode 122) may receive the common signal from the common signal source VSc, and the third pixel signal line 134c may receive the data signal VD3 corresponding to the blue sub-pixel.

Accordingly, in the driving method OP1b of the first mode, the first switching component 150 may couple the first output terminal 142_1 of the driving circuit 140 to the first pixel signal line 134a and disconnect the first output terminal 142_1 of the driving circuit 140 from the second pixel signal line 134b, the third pixel signal line 134c and the touch sensing electrode 120 in the timing sequence TS3, the first switching component 150 may couple the first output terminal 142_1 of the driving circuit 140 to the second pixel signal line 134b and disconnect the first output terminal 142_1 of the driving circuit 140 from the first pixel signal line 134a, the third pixel signal line 134c and the touch sensing electrode 120 in the timing sequence TS4, the first switching component 150 may couple the first output terminal 142_1 of the driving circuit 140 to the third pixel signal line 134c and disconnect the first output terminal 142_1 of the driving circuit 140 from the first pixel signal line 134a, the second pixel signal line 134b and the touch sensing electrode 120 in the timing sequence TS5, and the second switching component 160 may couple the common signal source VSc to the touch sensing electrode 120 in the first mode.

As shown in FIG. 8 and FIG. 11, a driving method OP2b of the second mode (e.g., a timing sequence TS6) is shown. Signals in the timing sequence TS6 are described in the following. The first output terminal 142_1 of the driving circuit 140 may provide a touch sensing signal VT1 corresponding to the touch sensing electrode 120 (e.g., the first touch sensing electrode 122). The signal source (e.g., the signal source VS1) controlling the switching state of the touch driving switching element 152 (e.g., the first touch driving switching element 152a) may provide a turn-on signal (e.g., a high voltage VH) to turn on the touch driving switching element 152 (e.g., the first touch driving switching element 152a). The signal source VS5 controlling the switching state of the first display driving switching element 154a, the signal source VS6 controlling the switching state of the second display driving switching element 154b and the signal source VS7 controlling the switching state of the third display driving switching element 154c may provide turn-off signals (e.g., low voltages VL) to turn off these switching elements. The signal source VS0 controlling the switching state of the common-signal switching element 162 (e.g., the first common-signal switching element 162a) may provide a turn-off signal (e.g., a low voltage VL) to turn off the common-signal switching element 162 (e.g., the first common-signal switching element 162a). Therefore, the touch sensing electrode 120 (e.g., the first touch sensing electrode 122) may receive the touch sensing signal VT1 from the driving circuit 140, and the first pixel signal line 134a, the second pixel signal line 134b and the third pixel signal line 134c do not receive the signal provided from the driving circuit 140. Accordingly, in the driving method OP2b of the second mode, the first switching component 150 may couple the first output terminal 142_1 of the driving circuit 140 to the touch sensing electrode 120 and disconnect the first output terminal 142_1 of the driving circuit 140 from the pixel signal lines 134, and the second switching component 160 may disconnect the common signal source VSc from the touch sensing electrode 120.

According to the aforementioned driving methods, the common signal source VSc provides the common signal to the touch sensing electrode 120 in the first mode, so as to enhance the displaying effect of the electronic panel 200. According to the aforementioned driving methods, the common signal source VSc is disconnected from the touch sensing electrode 120 to prevent the common signal source VSc from affecting the touch sensing electrodes 120 in the second mode, thereby preventing the common signal source VSc from affecting the touch sensing function.

Since the electronic panel 200 has a plurality of common-signal switching elements 162 and a plurality of touch sensing electrodes 120, the common-signal switching elements 162 may be turned on in the first mode to make the common signal source VSc be coupled to the touch sensing electrodes 120 and provide the common signal to the touch sensing electrodes 120, and the common-signal switching elements 162 may be turned off in the second mode to make the common signal source VSc be disconnected from the touch sensing electrodes 120.

In summary, in the present disclosure, due to the existences of the first switching component and the second switching component, the size of the driving circuit is reduced, the number of the required electronic components of the driving circuit is reduced, and/or the displaying effect of the electronic panel is enhanced.

Although the embodiments and their advantages of the present disclosure have been described as above, it should be understood that any person having ordinary skill in the art can make changes, substitutions, and modifications without departing from the spirit and scope of the present disclosure. In addition, the protecting scope of the present disclosure is not limited to the processes, machines, manufactures, material compositions, devices, methods and steps in the specific embodiments described in the description. Any person having ordinary skill in the art can understand the current or future developed processes, machines, manufactures, material compositions, devices, methods and steps from the content of the present disclosure, and then, they can be used according to the present disclosure as long as the same functions can be implemented or the same results can be achieved in the embodiments described herein. Thus, the protecting scope of the present disclosure includes the above processes, machines, manufactures, material compositions, devices, methods and steps. Moreover, each claim constitutes an individual embodiment, and the protecting scope of the present disclosure also includes the combination of each claim and each embodiment. The protecting scope of the present disclosure shall be determined by the appended claims.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. An electronic panel, having a first mode and a second mode for operating, the electronic panel comprising:
    a substrate having an active region and a peripheral region;

a driving circuit disposed in the peripheral region and having a first output terminal and a second output terminal;
a first electrode disposed in the active region;
a second electrode disposed in the active region;
a first signal line electrically connected to the first electrode;
a second signal line electrically connected to the second electrode;
a first switching component disposed in the peripheral region and electrically connected to the first output terminal, the second output terminal, the first signal line and the second signal line;
a second switching component disposed in the peripheral region and electrically connected to a common signal source, the first signal line and the second signal line; and
a third signal line electrically connected to the first switching component;
wherein the second switching component couples the common signal source to the first electrode and the second electrode simultaneously when the electronic panel operates in the first mode, and the second switching component disconnects the common signal source from the first electrode and the second electrode simultaneously when the electronic panel operates in the second mode;
wherein the driving circuit comprises a driving chip, and the driving chip provides a data signal related to displaying and a touch signal related to touch sensing;
wherein the first switching component comprises a first driving switching element, a second driving switching element and a third driving switching element, the first driving switching element is electrically connected to the first output terminal and the first electrode, the second driving switching element is electrically connected to the second output terminal and the second electrode, and the third driving switching element is electrically connected to the first output terminal and the third signal line.

2. The electronic panel according to claim 1, wherein the first output terminal and the second output terminal provide a common signal to the first electrode and the second electrode when the electronic panel operates in the first mode.

3. The electronic panel according to claim 1, wherein the first electrode and the second electrode are respectively separated from the first switching component by a first distance and a second distance, the first distance is greater than the second distance, the second switching component has a first switching element and a second switching element, the first switching element is electrically connected to the first electrode, the second switching element is electrically connected to the second electrode, and a size of the first switching element is greater than a size of the second switching element.

4. The electronic panel according to claim 1, further comprising:
a third electrode disposed in the active region and electrically connected to the third signal line;
wherein the first output terminal provides a data signal to the third electrode when the electronic panel operates in the first mode.

5. The electronic panel according to claim 4, wherein the third electrode is a pixel electrode.

6. The electronic panel according to claim 1, wherein the first electrode and the second electrode are touch sensing electrodes.

7. The electronic panel according to claim 1, wherein the first switching component disconnects the first output terminal from the first electrode when the electronic panel operates in the first mode.

8. The electronic panel according to claim 1,
wherein the first switching component couples the first output terminal to the third signal line and disconnects the first output terminal from the first electrode when the electronic panel operates in the first mode, and the first switching component couples the first output terminal to the first electrode and disconnects the first output terminal from the third signal line when the electronic panel operates in the second mode.

9. The electronic panel according to claim 8, wherein the first output terminal provides a data signal to the third signal line when the electronic panel operates in the first mode.

10. The electronic panel according to claim 8, wherein the first output terminal provides a touch signal to the first electrode when the electronic panel operates in the second mode.

11. The electronic panel according to claim 1, wherein when the electronic panel operates in the first mode, the first driving switching element is turned off to disconnect the first output terminal from the first electrode, and the third driving switching element is turned on to couple the first output terminal to the third signal line.

12. The electronic panel according to claim 1, wherein when the electronic panel operates in the second mode, the first driving switching element is turned on to couple the first output terminal to the first electrode, and the third driving switching element is turned off to disconnect the first output terminal from the third signal line.

13. The electronic panel according to claim 1, wherein the first switching component is disposed between the driving circuit and the active region.

14. The electronic panel according to claim 1, wherein the active region is disposed between the first switching component and the second switching component.

15. The electronic panel according to claim 1, wherein the first signal line and the second signal line are electrically connected between the first switching component and the second switching component.

* * * * *